June 29, 1971     H. ROSENBERG     3,589,913

METHOD OF MAKING CONNECTED PACKAGES

Filed Oct. 20, 1965     3 Sheets-Sheet 1

INVENTOR.
HARRY ROSENBERG
BY

June 29, 1971   H. ROSENBERG   3,589,913
METHOD OF MAKING CONNECTED PACKAGES
Filed Oct. 20, 1965   3 Sheets-Sheet 2

INVENTOR.
HARRY ROSENBERG
BY

June 29, 1971      H. ROSENBERG      3,589,913
METHOD OF MAKING CONNECTED PACKAGES
Filed Oct. 20, 1965      3 Sheets-Sheet 3
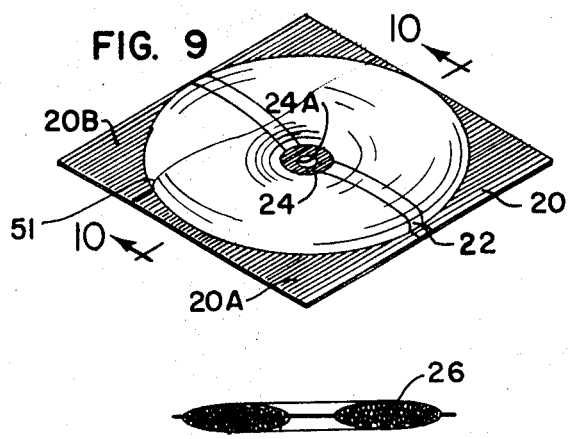
FIG. 9
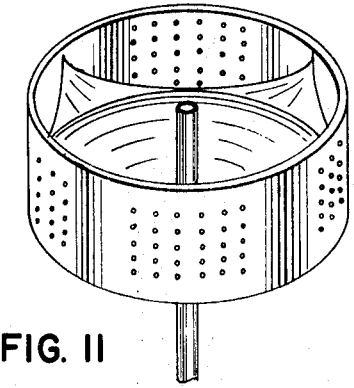
FIG. 11
FIG. 10
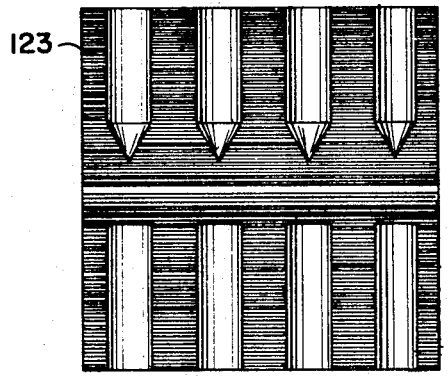
FIG. 13
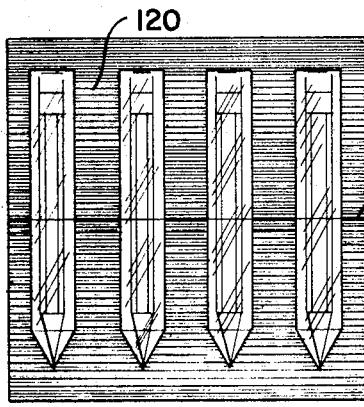
FIG. 14
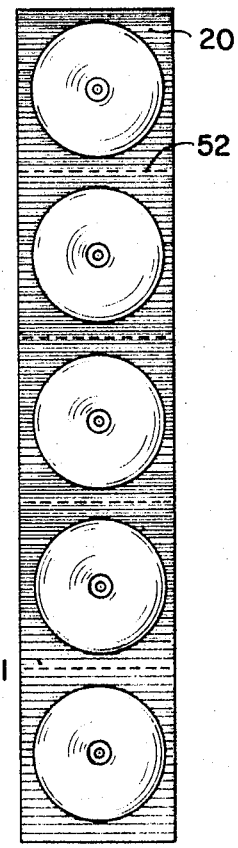
FIG. 12
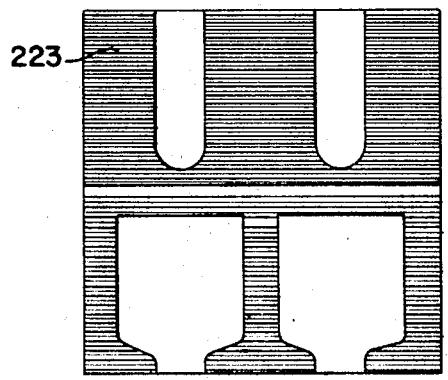
FIG. 15
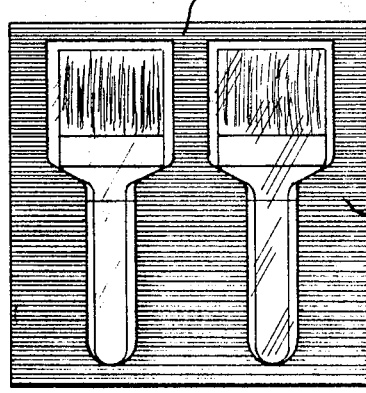
FIG. 16
INVENTOR.
HARRY ROSENBERG
BY United States Patent Office 3,589,913
Patented June 29, 1971

3,589,913
METHOD OF MAKING CONNECTED PACKAGES
Harry Rosenberg, Philadelphia, Pa., assignor to New
Jersey Machine Corporation, Hoboken, N.J.
Filed Oct. 20, 1965, Ser. No. 498,354
Int. Cl. B65f 29/02
U.S. Cl. 99—77.1
10 Claims

ABSTRACT OF THE DISCLOSURE

Connected packages are formed by a two stage sealing process. A material receiving chamber is formed in the first stage by completely forming an inner seal and partially forming an outer peripheral seal. The chamber is filled with material such as coffee. The outer peripheral seal is then completed as the first stage seals are made in the next succeeding package. A saw tooth cutter is employed to weaken the area between adjacent packages and to completely sever a predetermined number of them.

---

The present invention relates to packaging and more particularly to a method of making packages of coffee for use in conventional percolators and also the invention includes the package made by the method and the machine.

Heretofore coffee has been loosely packaged and the granular coffee has been placed in the circular strainer of a percolator-type coffee pot for brewing the desired flavor and the coffee grounds have been difficult to completely remove from the strainer with resulting loss of time and inconvenience to the householder.

An object of the present invention is to provide a method for making a novel package having the proper shape and the proper amount of coffee in the package for producing the desired flavor in coffee brewed in a percolator.

A further object is to provide a method of forming and filling packages whereby a single machine can perform the entire operation.

A further object is to provide a series of connected packages of a desired product whereby several packages of the product will be connected together to facilitate handling and sale and also to facilitate counting the packages for inventory purposes.

Other and further objects will be apparent as the description proceeds and upon reference to the accompanying drawings wherein:

FIG. 1 diagrammatically illustrates the clamping members, the package forming jaws and the means to form a tubular sheet around a tubular mandrel with filling pipes and package opening air jets positioned within the mandrel and showing the package forming jaws with the clamping members in open uppermost position.

FIG. 9 is a perspective of a completed doughnut-shaped package with coffee therein.

FIG. 10 is a section taken substantially on line 10—10 of FIG. 9.

FIG. 11 shows the package of FIG. 10 in the sieve of a percolator.

FIG. 12 is a plan view of a series of connected packages similar to that shown in FIG. 10 with perforations therebetween to permit separation.

FIG. 13 is a view of another form of jaw for making a package of the type shown in FIG. 14.

FIG. 15 is a view of the face of another jaw for making a package of the type shown in FIG. 16.

Figure 1:
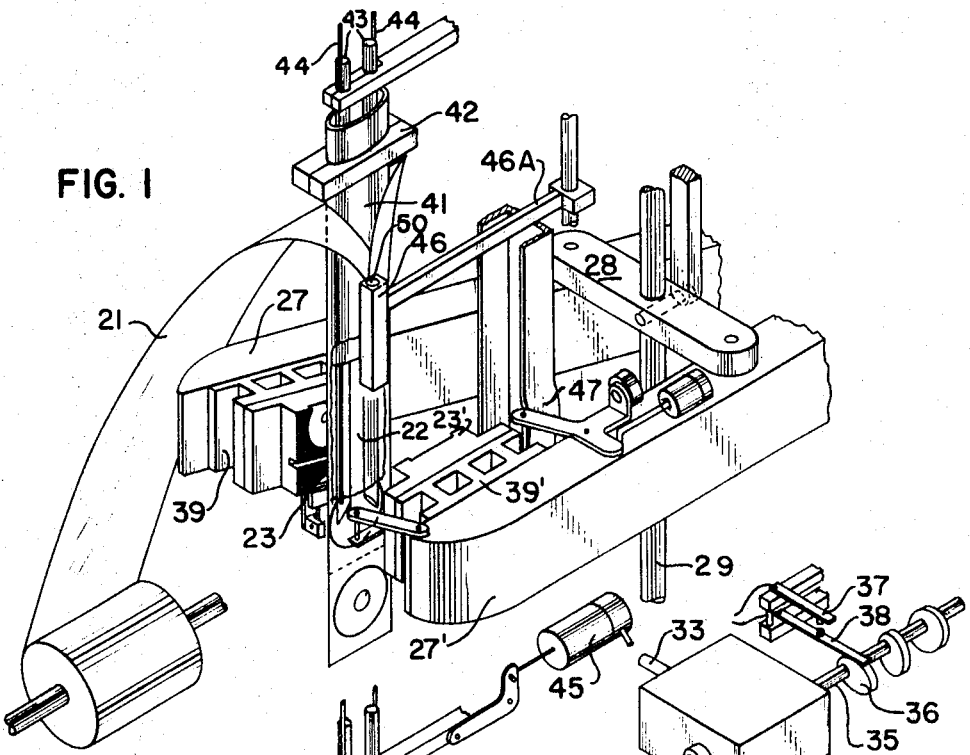

Referring more specifically to the drawings, a package 20 shown in FIGS. 9 and 10 is made of a single web 21 of filter paper type material coated on one surface which is folded inwardly and an overlapping seam 22 is formed by contacting the inner surfaces of the margins together and heat sealing the same to provide a seam of two plies overlying the package 20. The marginal portions of the package 20 are heat sealed together by corrugated jaws 23, 23' which have intermeshing corrugations to assure secure pressure on the web material and a center area 24 is heat sealed by central jaw elements 25, 25' thereby producing a doughnut shaped package in which coffee 26 is shown.

Figure 2:
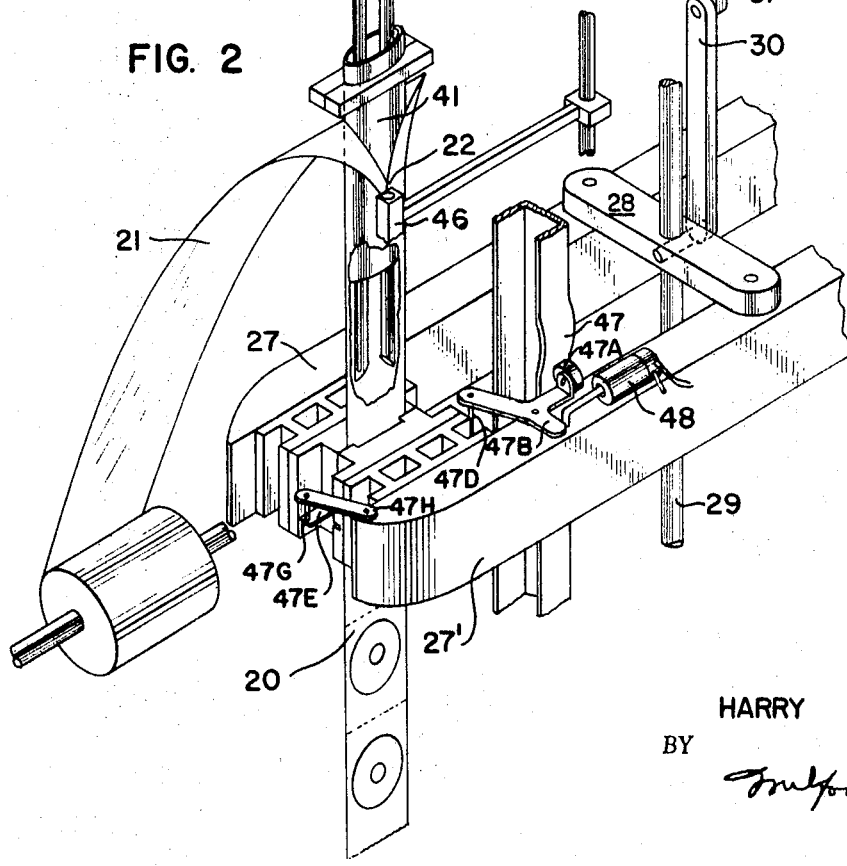
FIG. 2 shows the clamping members and jaws in closed position at the downward limit of motion and also shows the means to raise and lower the clamping members the desired distance and also showing means to raise and lower the filling tubes and showing the filling tubes in their raised position.
Figure 3:
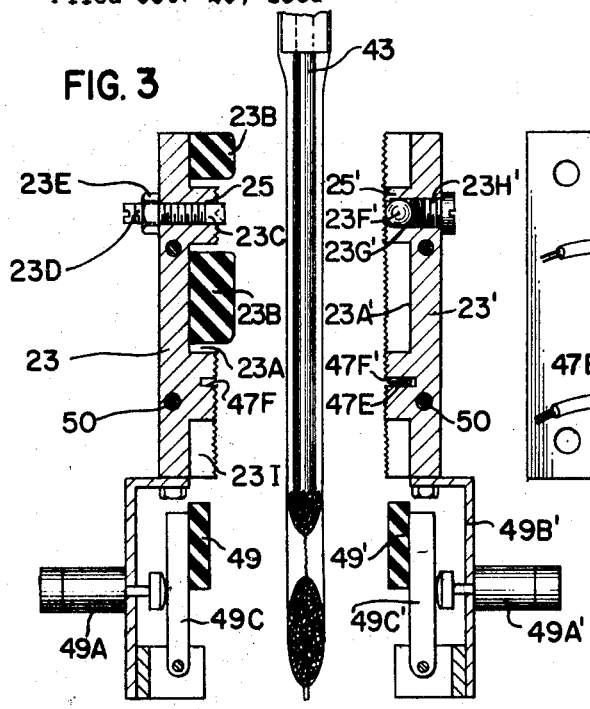
FIG. 3 is a fragmentary section of the jaws in open position corresponding to FIG. 1 and also showing the punch means and the strippers for removing the partially formed package from the jaws.

Referring more particularly to FIGS. 1 to 8, inclusive, the machine for packaging coffee includes a pair of clamp members 27, 27' pivotally mounted on a link 28 which is vertically movable relative to a supporting frame (not shown) by means of a rod 29 mounted for sliding movement in the frame, and suitable means are provided beyond the right ends of such clamp members as shown in FIGS. 1 and 2 to move the clamping members from the position shown in FIG. 1 to the position shown in FIG. 2 and to reversely move such clamp members. The means for performing this function are well known and include an air cylinder having a solenoid controlled valve with suitable stops provided to assure the proper positioning of the clamping members in open and closed position.

Means are provided to the clamp members transversely of their opening and closing positions and parallel to the rod 29 by suitable means including an adjustable pitman 30, an adjustable crank 31, a gear reduction box 32 driven by means of a shaft 33 from any suitable source of power which drives the crank shaft 34 which has a rearwardly extending cam shaft section 35 carrying a plurality of cams 36 which operate a plurality of switches 37 having arms 38 serving as followers to cooperate with the cams 36 to open and close electrical circuits at predetermined time intervals.

The jaw 23 is mounted on the clamp member 27 by any suitable means including a spacing element 39 while the jaw 23' is mounted on the clamp member 27' by means of a suitable spacer 39'. Each jaw is provided with a generally circular recess and since such recesses are similar, only one jaw 23 will be described, and where necessary the similar item will be identified by the same reference numeral with a prime (') after the reference numeral.

The jaw 23 is provided with a recess 23A which is greater than half a circle with the center section 25 being on the geometrical center of the curve and within the generally annular shaped recess 23A; a pad of yieldable resilient material 23B such as foam rubber or the like is mounted with the margins thereof being spaced approximately half an inch from the margins of the recess and the exposed face of the resilient pad extending beyond the corrugated face of the jaw. A tubular punch member 23C is mounted centrally of the boss 25 and held in adjusted position by a screw 23D and a lock nut 23E and such punch cooperates with a ball 23F' which is spring pressed by a spring 23G' the tension of which is adjusted by a screw 23H' with the ball being prevented from passage out of the bore by an internally extending rib. The tubular punch 23C, when the jaws are in closed position, projects beyond the corrugated face of the jaw 23 and extends into the bore carrying the ball 23F' thereby producing a cutting force on sheet material therebetween to produce an aperture 24A in the package.

Figure 5:
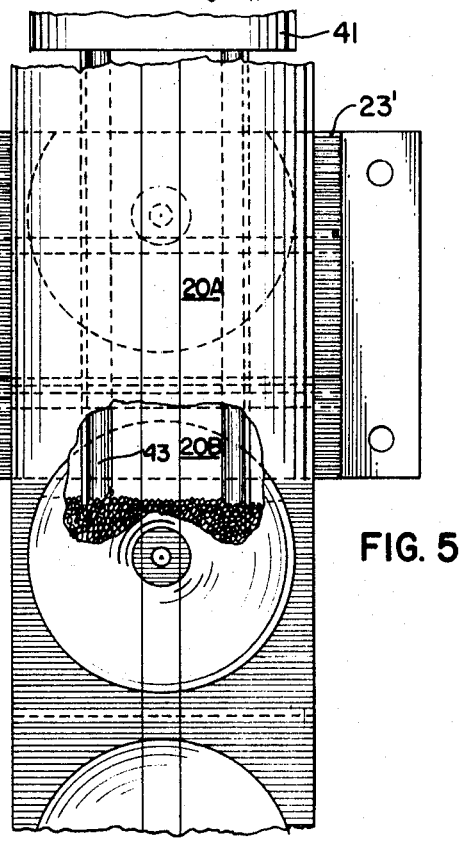
FIG. 5 is an elevation of a strip of formed packages as shown in FIG. 3 with one of the jaws in the background and showing the filling tubes in filling position for the previously formed package section.

The web of material 21 is fed from a supply roller over suitable guides (not shown) around a mandrel 41 supported in fixed position by a support 42, such mandrel being eliptical in shape and hollow for receiving a pair of filling tubes 43 and air supply tubes 44, and such filling tubes and air supply tubes are movable vertically as a unit by means of a solenoid controlled air cyclinder 45, suitably mounted on the frame to raise and lower the filling tubes and air tubes, the lower ends of the filling tubes being cut at an angle to provide a large mouth with the mouths of the tubes facing each other and adapted to extend into a partially formed package as shown in FIG. 5.

In FIG. 1 the filling tubes 43 are shown in filling position for a package which has been partially formed by the upper portion of the jaws 23 and 23' leaving the sides of the bags unattached in the area of the recesses 23A and 23A' so the filling tube 43 may extend into the partially formed package to guide the coffee into the lower portion thereof.

At this time the web of material 21 is folded with the inner marginal surfaces in contact with each other and with the double ply marginal seam in contact with the tube formed thereby over the mandrel 41 and a heated sealing bar 46 is pressed against the marginal seam 21 thereby sealing the marginal edges to provide a tube.

The filling tubes 43 are then withdrawn by operation of the air cylinder 45 by one of the cams 36 and one of the switches 37 to a raised position out of the path of the jaws 23, 23' and the jaws are closed in their raised position which is the closed position of the jaws of which the open position is shown in FIG. 1 and the closing of the jaws by the clamp members 27 and 27' causes the jaws to close on the tube of filter material thereby compressing it to flat condition and sealing the central section 24 and the major peripheral section outside of the recess 23A of the portion of the tube at the upper edge of the jaw. At the same time, the lower edge of the jaw having a generally circular recess 23 seals the remaining marginal portion of the package previously formed, as clearly shown in FIG. 4, and the closed clamps and jaws are moved downwardly to feed the partially formed package as well as the previously completely formed package one increment the length of the package and at this time the bar sealing element 46 is released to permit the free movement of the tube downwardly along the mandrel 41.

During this downward movement, a cam 47 mounted on a channel member of the frame is engaged by a follower 47A which moves a bell crank 47B connected by a struct 47D to a cutter bar 47E which lies in a recess 47F' in the jaw 23', the other end of the cutter 47E being connected by a strut 47G connected to a link 47H to produce substantially parallel motion of the cutter bar 47E in cooperation with the corresponding arm of the bell crank lever 47B. The cutting edge of the blade 47F is provided with serrations and the cutting edge of the cutter 47E is adapted to be received in a recess 47F in the jaw 23 to produce the severing action between the previously formed package and the partially formed package during the downward movement of the clamping members and the jaws. The cam 47 and follower 47A are arranged to produce only partial movement of the cutter 47E so that a number of perforations are provided between the adjacent packages without completely severing one package from another, suitable spring means being provided to retain the cutter 47E in its inoperative position.

Since it is frequently required to have a number of packages in a connected group and to have one connected group severed from another, complete cutting means is provided by means of a solenoid controlled air cylinder 48 which is operated in timed sequence by a stepping switch operated a step at a time by one of the switches 37 driven by one of the cams 36 and by the suitable selection of a stepping switch and proper adjustment thereof any predetermined number of packages can be kept connected in a single group and then severed after a predetermined number which may be ten or may be a dozen or may be one hundred, and the individual packages can be packaged in an accordion folded arrangement, if desired.

Figure 4:
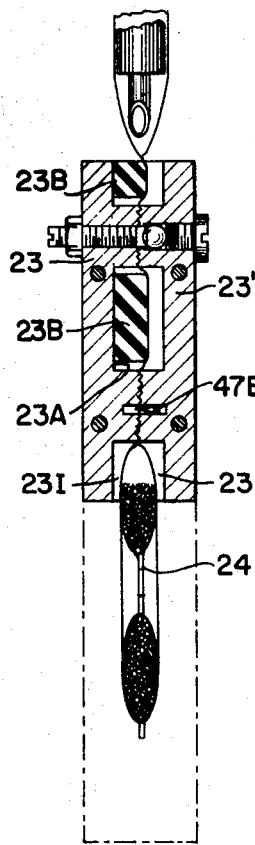
FIG. 4 is a fragmentary sectional view of the jaws in closed position corresponding to FIG. 2.
Figures 6, 7, 8:
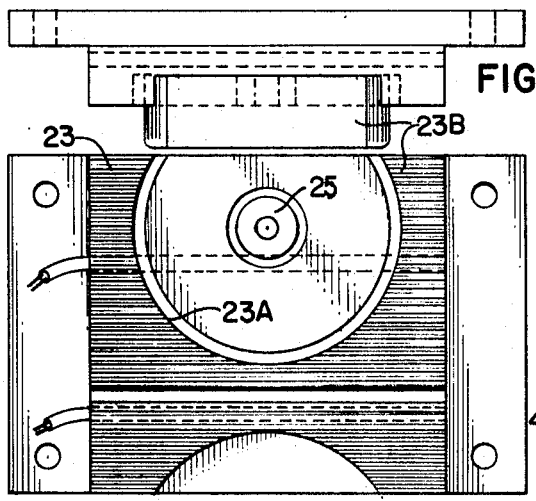
FIGS. 6, 7 and 8 are elevation, top plan and front end view, respectively, of one of the jaws.

To assure sufficient fullness in the portion of the web material within the outlines of the recess 23A, the resilient pad 23B pushed the material laterally into the recess 23A' as shown in FIG. 4, thereby assuring sufficient fullness to accommodate the desired amount of coffee or other material within the package.

It will be understood that the corrugations, i.e., grooves and lands serve to increase the pressure on the web material and some of the material may tend to remain in contact with the jaw faces. To prevent this from occurring, stripper pads 49, 49' are mounted on the jaws 23 and 23' for movement toward and away from the package and such pads are operated in timed relation by a suitable solenoid controlled air cylinder 49A mounted on a bracket 49B which bracket also pivotally supports a frame 49C which carries the pad 49 and these pads are operated by suitable cam and switch mechanism previously described.

OPERATION AND METHOD

From the above description, the operation is believed to be obvious, the web 21 being fed around the mandrel 41 forming a tube with an overlapping seam 22 which is heat sealed by the sealing bar 46 pressed against the seam 22 and against the mandrel 41 by suitable means operating on the pivoted support 46A by a suitable solenoid controlled pressure cylinder previously described controlled by a cam and switch. With the jaws in their raised position as shown in FIG. 1 and with the filling tubes 43 in their raised position as shown in FIG. 2, the jaws are closed corresponding to the position of FIG. 2 thereby forming a package of more than half a circle to an imaginary dividing line 51 shown in FIG. 9, which imaginary line is the top of the die 23, and when the jaws are brought together with the filling tubes 43 in their raised position, the bottom package section 20A is formed and simultaneously therewith the top section 20B of the previously formed package is sealed. The jaws are then moved down with the jaws still in their closed position a distance corresponding to the length of a package and the jaws are then opened while the sealing bar 46 is pressed against the seam 22 and the filling tubes 43 are lowered to the filling position shown in FIG. 1 and shown in FIGS. 5 and 3 and coffee is then passed through the filling tubes into the partially formed package 20A and after the necessary amount of coffee has been placed in the partially formed package 20A the filling tubes 43 are withdrawn and the clamping members and jaws are moved to their raised position ready to form another package. During the downward movement of the jaws and the clamping members, the cutter 47E is actuated by the cam 47, as explained above, to produce a plurality of perforations 52 between the packages 20 shown in FIG.

12, and after a predetermined number of packages have been formed such as five shown in FIG. 12, the solenoid controlled piston and cylinder 48 are actuated to completely sever the five packages from the web, which operation occurs while the jaws are closed, as explained above.

In FIGS. 13 and 14, a modified jaw 123 and a modified package 120 is shown in which pencils are packaged in a transparent film by using dies of a type shown at 123 and using the machine of the present invention with a plurality of guide tubes 43 corresponding to the number of pencils in a package, the bottom portion of the package below the imaginary line 151 being formed with the upper portion of the package above the line 151 being formed by the lower portion of the die. With this arrangement it is possible to package very long pencils even with a relatively short die or jaw, since it is only necessary that a package be closed at both ends and by suitable adjustment of the crank 31 and the pitman 30 will provide for the desired length of package.

The die 223 in FIG. 15 is used to form the package 220 in FIG. 16 which shows how an object having a wide portion at one end and a narrow portion at the other, such as a paint brush, can be packaged by the present equipment using suitable guide tubes of the proper shape to feed the paint brushes to the partially formed package shown below the dividing line 251, and it will be evident that longer paint brushes can be packaged with the same dies or jaws by obtaining the desired adjustment of the crank 31 and the connecting rod 30.

It will be apparent that the package of coffee shown in FIG. 10 is used in a sieve of a percolator shown in FIG. 11 with the opening 24A going over the vertical tube of the percolator sieve and the marginal portions of the package outside of doughnut shape extending upwardly or downwardly as shown.

It will thus be seen that applicant has provided a new and useful machine, method and product for producing coffee packages expeditiously and providing for making coffee without having coffee grounds retained on the sieve or passing into the percolator.

The jaws clamp member 27, 27' are moved to and from each other by means of an air cylinder extending substantially parallel to the clamp members and lying therebetween with the cylinder mounted on a fixed portion of the frame and the piston rod connected to one end of each two links with other ends of the links pivoted to the respective clamp members whereby the clamp members move in accurately controlled timed relation to each other. The clamp activating air cylinder is controlled by one of the cams 36, one of the switches 37 and the cooperating follower 38 which controls a solenoid valve causing the ari to be driven into the clamp actuating cylinder.

The clamp member 27, 27' also carry the stripper pads 49, 49' operated in timed relation to assure that the package is released from the jaws and also to assure that air enclosed within the package 20 is expelled by the yieldable force exerted by the air cylinders 49A and 49A', thereby making it possible to package a number of packages of coffee or other granular material in a minimum of space reducing the overall size of the shipping and storage facilities needed.

The sealing bar 46 and the jaws are heated by suitable electrical resistance heating units 50 which are controlled by suitable thermostats to obtain the desired heating effect and thereby seal the edges of the packages. The filter paper used for the coffee packages is coated with a suitable material which heat seals the seam formed by the overlap of the web material 21.

In some packaging it is desirable to use an impervious web of material such as a metal foil. In such cases where it is desired to have the material used to package coffee, the metal foil will be perforated by suitable means such as needles mounted in one jaw adapted to extend into the recess in the other jaw and cooperate with a platen so the needles will produce the desired arrangement of holes in the impervious material thereby adapting the present machine for multiple uses.

The air tubes 44 carried by the coffee guide filling tubes serve to effectively spread the opposite walls of the partially formed package section 20A before the coffee is fed to avoid any objectionable interference with the flow of coffee into the partially formed package section. It will be apparent that suitable means controlled by the cam shaft 35 cause the flow of air and the stoppage of the flow of air to obtain the desired effect and to avoid any back pressure that might interfere with the flow of coffee through the filling tubes 43. It will also be apparent that the flow of coffee is controlled by suitable means operated by the cam shaft 35.

The machine and method may be used for making many different types of packages with the selection of the proper jaws and the selection of the proper length of movement of the jaws in a direction transverse to their closing and opening movement.

It will be apparent that changes may be made in the precise construction within the spirit of the invention as defined by the valid scope of the claims.

What is claimed is:

1. The method of making connected groups of packages comprising feeding at least two plies lengthwise in a step-by-step fashion, successively pressing said plies together during the periods of rest in the feed of said plies to form a succession of packages having material receiving chambers each formed by an outer peripheral sealed area and an inner sealed area, successively moving a saw tooth cutter in a controlled manner against the plies during such periods of rest to cut the material of the plies between each package, and during such controlled successive movements of the saw tooth cutter moving the same as given number of times a given distance such as will effect only a weakening of the plies between certain connected adjacent packages, and at interspaced given periods moving the same saw tooth cutter a greater given distance such as to cause a complete severance of the plies between other adjacent packages whereby one predetermined size group of connected packages will be completed from another predetermined size group thereof.

2. The method of making a succession of sealed packages having a material receiving chamber formed by an outer peripheral sealed area and an inner sealed area, comprising intermittently feeding a pair of plies linearly, in a period of rest of the feed of such plies sealing the plies to form a major part only of the package being formed including the inner sealed area and part of the outer peripheral sealed area composed of the leading end edge portion of such outer peripheral sealed area in the direction of feed of the plies and a major portion of the side edges thereof but not the entire side edges of such outer peripheral sealed area, the area between the inner seal and the partial outer peripheral seal forming the material receiving chamber, advancing the plies to feed such partially formed package to a spaced place for the insertion of material thereinto, inserting material into the sealed portion of the partially formed package at said spaced place during another period of rest on the feed of such plies, and then without advancing the plies sealing the remaining part of the package being formed including the trailing end edge portion of the remainder of the side edges of such outer peripheral sealed area to complete the sealing of all edges of the package so as to provide a continuous seal around said inner sealed area and the material in such package, and simultaneously sealing the plies to form a major part only of the next sealed area and the leading end edge portion and a major portion of the side edges of the outer peripheral sealed area but not the entire side edges thereof, and repeating the process for the desired number of packages.

3. The invention according to claim 2 in which during repetitions of said other sealing step successively moving a saw tooth cutter against the plies to cut the material of the plies between each package, such successive movements of the saw tooth cutter being controlled to cause the same to move a given number of times a given distance such as will effect only a weakening of the plies between certain connected adjacent packages, and at interspersed intervals to cause the same to move a greater given distance such as to cause a complete serverance of the plies between other adjacent packages.

4. The method of making a succession of sealed packages having a material receiving chamber formed by an outer peripheral sealed area and an inner sealed area, comprising intermittently feeding a pair of plies linearly, in a period of rest of the feed of such plies sealing the plies to form in the direction of feed of the plies the major leading part only of a package having a material receiving chamber the outer periphery of which is a major arc of a circle and to form a complete sealed central portion, advancing the plies to feed such partially formed package to a spaced place for the insertion of material thereinto, inserting material into the sealed portion of the partially formed package at said spaced place during another period of rest in the feed of such plies, and then without advancing the plies sealing the remaining part of the package being formed to complete the circular configuration of the outer periphery of the material receiving chamber and thereby complete the annular configuration of such chamber, and simultaneously sealing the plies to form a major part only of the next succeeding package being formed including the outer periphery of the material receiving chamber thereof in the form of a major arc of a circle and said complete sealed central portion thereof, and repeating the process for the desired number of packages.

5. The method defined in claim 4, including the step of cutting the limited central sealed portion to facilitate the insertion therethrough of a package receiving element.

6. The method of making a package comprising intermittently feeding a pair of plies linearly, in a period of rest of the feed of such plies sealing the plies over a major lower part only of the leading end of the container in the direction of feed of the plies, including the leading end edge thereof and a major portion of the side edges thereof but not the entire side edges by sealing the peripheral portions thereof so that such major lower part is in the form of a major arc of a circle, and simultaneously sealing the plies together in a limited central portion, advancing the plies to feed such partially formed container to a spaced place for the insertion of material thereinto, inserting material into the sealed portion of the partially formed container at said spaced place, and then without advancing the plies sealing the remaining top part of the container including the top and the remainder of the side edges of the same container so that such upper part forms the remainder of such circle, and simultaneously sealing the plies over a major power part only of the leading end of the next succeeding container including the leading end and a major portion of the side edges thereof but not the entire side edges thereof by sealing the peripheral portions thereof, forming an aperture in the sealed central area, and repeating the process for the desired number of packages.

7. The invention according to claim 6 in which ground coffee is the inserted material.

8. The method of making a package constituted of a pair of superposed porous plies between which is located a discrete given mass of ground coffee contained in an annularly-shaped chamber formed therebetween and approximating the configuration of the interior area of a sieve of a coffee percolator, comprising feeding a pair of plies linearly in a step-by-step fashion and in the periods of rest in the feed of said plies, initially forming an incomplete part of such annularly-shaped chamber, said incomplete chamber part surrounding the central area within the annular-shape and capable of receiving the entire bulk of such given mass of coffee, placing the entire bulk of such given mass of coffee in such incomplete chamber part at one place in the feed of the plies, and then at a place removed from such one place completing the formation of the chamber between such plies so that the plies are connected together around the complete outer and inner peripheries of the annularly-shaped chamber to completely close the latter, and in the areas thereof enclosed by such inner periphery of the chamber and located exteriorly of such outer periphery of the chamber are sealedly connected together in a plane containing the horizontal central section of such chamber, whereby the porous portions of the plies forming the walls of such chamber are in spaced relation and offset from such sealed areas.

9. The method of making a package constituted of a pair of superposed porous plies between which is located a discrete given mass of ground coffee contained in an annularly-shaped chamber formed therebetween and approximating the configuration of the interior area of a sieve of a coffee percolator, comprising feeding a pair of plies linearly in a step-by-step fashion and in the periods of rest in the feed of said plies, initially forming an incomplete part of such annularly-shaped chamber, said incomplete chamber part constituting a major part of the complete annularly-shaped chamber, surrounding the central area within the annular-shaped and capable of receiving the entire bulk of such given mass of coffee in such incomplete chamber part at one place in the feed of the plies by feeding such coffee thereinto in two streams disposed on opposite sides of the central area within the annular-shape, and then at a place removed from such one place completing the formation of the chamber between such plies so that the plies are connected together around the complete outer and inner peripheries of the annular-shaped chamber to completely close the latter, and in the areas thereof enclosed by such inner periphery of the chamber and located exteriorly of such outer periphery of the chamber are sealedly connected together in a plane containing the horizontal central section of such chamber, whereby the porous portions of the plies forming the walls of such chamber are in spaced relation and offset from such sealed areas.

10. The method of making a package constituted of a pair of superposed porous plies between which is located a discrete given mass of ground coffee contained in an annularly-shaped chamber formed therebetween and approximating the configuration of the interior area of a sieve of a coffee percolator, comprising feeding a pair of plies linearly in a step-by-step fashion and in the periods of rest in the feed of said plies, initially forming an incomplete part of such annularly-shaped chamber, said incomplete chamber part surrounding the central area within the annular shape and capable of receiving the entire bulk of such given mass of coffee, forcing apart said porous portions of the plies so as to permit placement of said coffee in said incomplete chamber part, placing the entire bulk of such given mass of coffee in such incomplete chamber part at one place in the feed of the plies, and then at a place removed from such one place completing the formation of the chamber between such plies so that the plies are connected together around the complete outer and inner peripheries of the annularly-shaped chamber to completely close the latter, and in the areas thereof enclosed by such inner periphery of the chamber and located exteriorly of such outer periphery of the chamber are sealedly connected together in a plane containing the horizontal central section of such chamber, whereby the porous portions of the plies forming the walls of such chamber are in spaced relation and offset from such sealed areas, said porous portions of the plies being pressed together during the formation of said initial incomplete chamber part, and simultaneously the portions of the plies forming the central area within the annular shape are opened to permit the passage of a percolator water tube therethrough.

References Cited

UNITED STATES PATENTS

| | | | |
|---|---|---|---|
| 1,947,523 | 2/1934 | Hirschhorn | 99—77.1 |
| 2,826,025 | 3/1958 | Swartz | 53—180 |
| 3,162,539 | 12/1964 | Repko | 99—171 |
| 3,188,781 | 6/1965 | Aquarius et al. | 53—180 |
| 3,209,676 | 10/1965 | Zimmermann et al. | 99—77.1X |
| 2,606,412 | 8/1952 | Salfisberg | 53—28 |
| 2,460,735 | 2/1949 | Carroll | 99—77.1 |
| 3,420,675 | 1/1969 | Costas | 99—77.1 |

MORRIS O. WOLK, Primary Examiner

S. B. DAVIS, Assistant Examiner

U.S. Cl. X.R.

53—28, 180; 99—171

UNITED STATES PATENT OFFICE
CERTIFICATE OF CORRECTION

PO-1050 (5/69)

Patent No. 3,589,913    Dated June 29, 1971

Inventor(s) Harry Rosenberg

It is certified that error appears in the above-identified patent and that said Letters Patent are hereby corrected as shown below:

Col. 6, line 38, "as" first occurrence, should be --a--.

Col. 6, line 45, "completed" should read --completely separated--.

Col. 6, line 66, after "portion", "of" should read --and--.

Col. 6, line 71, after "next" the following has been ommitted --succeeding package being formed including the inner--.

Col. 8, line 29, "annular-shaped" should read --annular-shape--.

Col. 8, line 30, after "coffee" should be inserted --, placing the entire bulk of such given mass of coffee--.

Signed and sealed this 8th day of February 1972.

(SEAL)
Attest:

EDWARD M. FLETCHER, JR.
Attesting Officer

ROBERT GOTTSCHALK
Commissioner of Patents